(12) United States Patent
Nie et al.

(10) Patent No.: US 11,441,034 B2
(45) Date of Patent: Sep. 13, 2022

(54) POLYSILOXANE COMPOSITION

(71) Applicant: WACKER CHEMIE AG, Munich (DE)

(72) Inventors: Jian Nie, Shanghai (CN); Minlong Xi, Shanghai (CN)

(73) Assignee: WACKER CHEMIE AG, Munich (DE)

( * ) Notice: Subject to any disclaimer, the term of this patent is extended or adjusted under 35 U.S.C. 154(b) by 36 days.

(21) Appl. No.: 17/048,738

(22) PCT Filed: Apr. 19, 2018

(86) PCT No.: PCT/CN2018/083707
§ 371 (c)(1),
(2) Date: Oct. 19, 2020

(87) PCT Pub. No.: WO2019/200579
PCT Pub. Date: Oct. 24, 2019

(65) Prior Publication Data
US 2021/0238417 A1 Aug. 5, 2021

(51) Int. Cl.
*C08L 83/04* (2006.01)
*C08K 3/013* (2018.01)
*C08G 77/16* (2006.01)
*C08K 5/00* (2006.01)
*C08K 5/5419* (2006.01)
*C08K 5/5425* (2006.01)
*C08K 5/544* (2006.01)
*C08K 5/57* (2006.01)

(52) U.S. Cl.
CPC .............. *C08L 83/04* (2013.01); *C08G 77/16* (2013.01); *C08K 3/013* (2018.01); *C08K 5/0016* (2013.01); *C08K 5/544* (2013.01); *C08K 5/5419* (2013.01); *C08K 5/5425* (2013.01); *C08K 5/57* (2013.01); *C08G 2190/00* (2013.01); *C08L 2205/025* (2013.01); *C08L 2312/08* (2013.01)

(58) Field of Classification Search
CPC ...................................................... C08L 83/04
See application file for complete search history.

(56) References Cited

U.S. PATENT DOCUMENTS

| | | | |
|---|---|---|---|
| 4,001,168 A | 1/1977 | Maass et al. | |
| 4,296,228 A * | 10/1981 | Innertsberger | C08K 5/54 524/588 |
| 5,705,587 A * | 1/1998 | Hatanaka | C08L 83/04 528/17 |
| 5,932,650 A | 8/1999 | Bayly | |
| 2007/0237912 A1 | 10/2007 | Correia | |
| 2010/0139843 A1 | 6/2010 | DeCato | |
| 2020/0115503 A1* | 4/2020 | Langerbeins | C08G 77/20 |

FOREIGN PATENT DOCUMENTS

| | | |
|---|---|---|
| CA | 2396485 | 7/2002 |
| CN | 101466793 A | 6/2009 |
| CN | 105295828 A | 2/2016 |
| CN | 107760257 A | 3/2018 |
| CN | 107760258 A | 3/2018 |
| JP | 7090083 A2 | 4/1995 |
| JP | 2009542848 A | 12/2009 |
| KR | 20070117657 A | 12/2007 |
| WO | 08005293 A1 | 1/2008 |
| WO | 2015003045 A1 | 1/2015 |
| WO | WO 2018/193107 | * 10/2018 |

* cited by examiner

*Primary Examiner* — Marc S Zimmer
(74) *Attorney, Agent, or Firm* — Brooks Kushman P.C.

(57) ABSTRACT

A polysiloxane composition which is curable by condensation, contains at least one hydroxyl-terminated polyorganosiloxane, at least one diacetoxysilane optionally bearing an alkoxy group, at least one multifunctional alkoxysilane, at least one filler, and at least one catalyst.

20 Claims, No Drawings

POLYSILOXANE COMPOSITION

CROSS REFERENCE TO RELATED APPLICATIONS

This application is the U.S. National Phase of PCT Appln. No. PCT/CN2018/083707 filed Apr. 19, 2018, the disclosure of which is incorporated in its entirety by reference herein.

BACKGROUND OF THE INVENTION

1. Field of the Invention

The present invention relates to a polysiloxane composition, and particularly to a virtually non-corrosive polysiloxane composition that can cure at room temperature to form an elastomer with reduced modulus.

2. Description of the Related Art

With a unique stress-strain behavior, i.e. low stress and high elongation, low modulus, room temperature vulcanized (RTV) silicone rubbers are especially suitable for expansion joints in buildings and for sealing joints between concrete parts as they can withstand significant deformation caused by temperature, humidity and stress. Existing low-modulus RTV silicone rubbers are usually oxime-curing, amide-curing or alkoxy-curing. Basically, their low modulus property is achieved by adding chain extenders or a large amount of plasticizer.

For example, oxime-curing RTV silicone rubbers typically uses methyl- or vinyl-bis(methylethylketoxime)silane as a chain extender, and methyl- or vinyl-tris(methylethylketoxime)silane as a crosslinking agent to achieve low modulus; amide-curing RTV silicone rubbers typically uses macromolecular chain extenders and crosslinkers with a special structure to achieve low modulus; and alkoxy-curing RTV silicone rubbers often uses ultra-high-molecular weight (UHMW) base polymers and a large amount of plasticizer to achieve low modulus.

Theoretically, the addition of a chain extender allows the molecular chains of the base polymer, usually an α,ω-dihydroxypolydimethylsiloxane, to extend linearly while crosslinking, reducing crosslinking points, thus achieving low modulus. In this method, however, it is difficult to control the relationship between the chain-extension and crosslinking rates. In particular, for alkoxy-curing RTV silicone rubbers, few literature references have suggested that low modulus can be achieved by adding a chain extender. The reason may be that alkoxy-based chain extenders are not reactive enough to react with polymers to achieve a reduced modulus.

At present, low modulus alkoxy-curing RTV silicone rubbers are usually prepared by adding plasticizers such as methyl silicone oils and α,ω-dimethoxypolydimethylsiloxane, but the plasticizers will bleed out after the polysiloxane compositions are cured, causing contamination of surrounding substrates.

SUMMARY OF THE INVENTION

Given that low modulus oxime-curing RTV silicone rubbers have poor mechanical properties and causes environmental pollution, that the raw materials of amide-curing RTV silicone rubbers are rare and expensive, and that the plasticizers added in low modulus alkoxy-curing RTV polysiloxane compositions will bleed out after curing, leading to construction pollution, the present invention provides a virtually non-corrosive polysiloxane composition, which can cure to form an elastomer with reduced modulus—without the need for a large amount of plasticizers.

DETAILED DESCRIPTION OF THE PREFERRED EMBODIMENTS

A first aspect of the present invention provides a polysiloxane composition comprising the following ingredients:
a) a hydroxyl-terminated polyorganosiloxane;
b) a diacetoxysilane, having the following general formula:

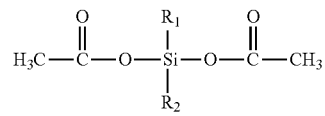

where, $R_1$ and $R_2$ are each independently an alkyl group, or an alkoxy group having one or more carbon atoms;
c) a multifunctional alkoxysilane;
d) a filler; and
e) a catalyst.

Ingredient (a)

According to the present invention, ingredient (a) is used as a base polymer, which can be various hydroxyl-terminated polyorganosiloxanes or mixtures thereof conventionally used in the art for preparing RTV silicone rubbers, generally being an α,ω-dihydroxypolydimethylsiloxane with a kinematic viscosity at 25° C. usually ranging from 1,000 to 350,000 mm$^2$/s, preferably from 20,000 to 100,000 mm$^2$/s. As used herein, the term "kinematic viscosity" is measured according to DIN 51562, unless otherwise specified.

According to the present invention, ingredient (a) is usually used in an amount of from 10 wt % to 85 wt %, preferably from 20 wt % to 50 wt %, based on the total weight of the starting materials of the polysiloxane composition.

Ingredient (b)

According to the present invention, ingredient (b) acts as a chain extender to increase the molecular chain length of the hydroxyl-terminated polyorganosiloxane.

In the general formula of ingredient (b), $R_1$ and $R_2$ are each independently an alkyl group, preferably a C1-C16 alkyl group such as methyl, ethyl, n-propyl, isopropyl, n-butyl, isobutyl, t-butyl, n-pentyl, isopentyl, t-pentyl, n-hexyl, isohexyl, t-hexyl, n-heptyl, isoheptyl and neoheptyl; or an alkoxy group having more than one carbon atom, preferably 1 to 16 carbon atoms, more preferably 2 to 16 carbon atoms, such as methoxy, ethoxy, n-propoxy, isopropoxy, n-butoxy, isobutoxy, t-butoxy, n-pentoxy, isopentoxy, t-pentyloxy, n-hexyloxy, isohexoxy, t-hexoxy, n-heptyloxy, isoheptyloxy and neoheptyloxy.

According to the present invention, ingredient (b) is used in an amount varying with the type of chain extender, suitably in an amount of from 0.03 to 1.9 wt %, for example 0.05 wt %, 0.1 wt %, 0.3 wt %, 0.5 wt %, 0.7 wt %, 0.9 wt %, 1.1 wt %, 1.3 wt %, 1.5 wt %, 1.7 wt % and 1.9 wt %, based on the total weight of the starting materials of the polysiloxane composition.

In some embodiments of the invention, ingredient (b) has a general formula, where $R_1$ and $R_2$ are each independently a C1-C16 alkyl group, and the mass ratio of ingredient (a)

to ingredient (b) is (75-1400):1. In other embodiments of the invention, ingredient (b) has a general formula, where $R_1$ and $R_2$ are each independently an alkoxy group having 1 to 16 carbon atoms, and the mass ratio of ingredient (a) to ingredient (b) is (20-1400):1.

Ingredient (c)

According to the present invention, ingredient (c) serves as a crosslinking agent, which can be various multifunctional alkoxysilane crosslinking agents having a functionality≥3 that are conventionally used in the art for preparing alkoxy-curing RTV silicone rubbers. Examples of suitable multifunctional alkoxysilanes include methyltrimethoxysilane, methyltriethoxysilane, vinyltrimethoxysilane, vinyltriethoxysilane, tetramethoxysilane, tetraethoxyoxysilane, phenyltrimethoxysilane, phenyltriethoxysilane, but not limited thereto.

Ingredient (c) is suitably used in an amount of from 0.5 wt % to 8 wt %, based on the total weight of the starting materials of the polysiloxane composition. In order to balance the chain-extension and crosslinking rates, ingredient (b) is suitably used in an amount of from 0.03 wt % to 1.9 wt %, while ingredient (c) is suitably used in an amount of from 0.5 wt % to 5 wt %, based on the total weight of the starting materials of the polysiloxane composition. If the amount of ingredient (c) is less than the corresponding proportion, the polysiloxane composition cures slowly or not at all, and if it exceeds the proportion, the chain extension is not effective.

Ingredient (d)

According to the present invention, ingredient (d) can be various fillers conventionally used in the art, such as calcium carbonate (including precipitated calcium carbonate, ground calcium carbonate, and activated calcium carbonate), silica, diatomaceous earth, bentonite (such as sodium bentonite and calcium bentonite), kaolin, talc, silicon powder, titanium dioxide, alumina, quartz powder and clay minerals, but not limited thereto.

Ingredient (d) is generally used in an amount of less than 70 wt %, such as from 10 wt % to 50 wt %, based on the total weight of the starting materials of the polysiloxane composition. In general, the higher the filler content in polysiloxane compositions is, the more difficult it is to reduce the modulus of cured elastomer. According to the present invention, a polysiloxane composition, having a high filler content typically ranging from 20 wt % to 60 wt %, especially from 40 wt % to 60 wt %, can also cure to form an elastomer with significantly reduced modulus.

Ingredient (e)

According to the present invention, the catalyst can be various organotitanium or organotin catalysts conventionally used in the art. Examples of suitable organotitanium catalysts include tetra-n-butyl titanate (Tn-BT), tetraisobutyl titanate (Ti-BT), tetra-t-butyl titanate (Tt-BT), tetraisopropyl titanate (Ti-PT), tetraisooctyl titanate (TOT), diisobutyl bis(acetylacetonate) titanate (DIBAT), diisopropyl bis(acetylacetonate) titanate (DIPAT), diisopropyl bis(ethyl acetoacetate) titanate, dibutyl bis(ethyl acetoacetate) titanate, but not limited thereto. Examples of suitable organotin catalysts include dibutyltin dilaurate, dioctyltin dilaurate, dibutyltin maleate, dibutyltin diacetate, dibutyltin dioctoate, dibutyltin diacetyl acetonate, dibutyltin oxide and dioctyltin oxide, but not limited thereto.

According to the present invention, the amount of the ingredient (e) can be specified by those skilled in the art according to its type and the expected curing speed, generally in the range of from 0.01 wt % to 5 wt % based on the total weight of the starting materials of the polysiloxane composition.

Ingredient (f)

According to the present invention, the polysiloxane composition can further comprise a silicone resin (f) to further reduce the modulus of the cured elastomer, which can be any organosilicone resins known in the art, having the following general formula:

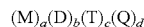

$$(M)_a(D)_b(T)_c(Q)_d$$

where M represents a monofunctional siloxane unit $R_3SiO_{1/2}$; D represents a difunctional siloxane unit $R_2SiO_{2/2}$; T represents a trifunctional siloxane unit $RSiO_{3/2}$; Q represents a tetrafunctional siloxane unit $SiO_{4/2}$; and at least one of a, b, c and d is non-zero.

The silicone resin herein include any one, or a combination, of the structural units M, D, T and Q, and can be, for example, MD, MT, MQ, T, DT and MDT resins, and has a dynamic viscosity at 25° C. of suitably less than 500,000 mPa·s, for example, from 10,000 to 500,000 mPa·s.

According to the present invention, the amount of ingredient (f) can be specified by those skilled in the art as needed, generally being less than 10 wt %, such as from 1 wt % to 5 wt %, based on the total weight of the starting materials of the polysiloxane composition.

Ingredient (g)

According to the present invention, the polysiloxane composition can offer a reduced modulus without a plasticizer (g), but an appropriate amount of the plasticizer may also be included to further reduce the modulus. Examples of suitable plasticizers include dimethylsilicone oils having a dynamic viscosity of from 10 to 5,000 mPa·s at 25° C. and mineral oils having a dynamic viscosity of from 10 to 100 mPa·s at 25° C., but not limited thereto. Ingredient (g) is suitably used in an amount of less than 20 wt %, for example, from 0 wt % to 15 wt %, preferably from 0 wt % to 10 wt %, based on the total weight of the starting materials of the polysiloxane composition.

Other Optional Ingredients

The polysiloxane composition of the present invention may also optionally comprise other conventional aids and additives, such as UV absorbers (e.g. salicylic acid ester, benzotriazole, substituted acrylonitrile and triazine UV absorbers), and UV stabilizers (e.g. hindered amine light ultraviolet stabilizers), but are not limited thereto.

The polysiloxane composition of the present invention comprises less than 4 parts, for example less than 3 parts, less than 2 parts, less than 1 part, less than 0.5 part, preferably less than 0.1 part by weight of multifunctional acetoxysilane with a functionality≥3, based on 100 parts by weight of ingredient (a). The polysiloxane composition releases alcohol and acetic acid as by-products during the curing process. Since the acetoxysilane (including diacetoxysilane and multifunctional acetoxysilane) is used in a small amount, and the filler in the composition may adsorb the acetic acid released, a tiny amount of acetic acid, significantly lower than that of released alcohol, is emitted during curing. Therefore, the polysiloxane composition of the present invention still offers the advantages of "alkoxy-curing RTV silicone rubbers", is virtually non-corrosive, and can be used as sealants, adhesives or coating materials for the applications in construction, electronics, electric and automobile sectors.

The polysiloxane composition of the present invention is in one package.

The second aspect of the present invention provides an elastomer obtained by curing the polysiloxane composition according to the first aspect of the present invention.

The invention is further illustrated by the following examples, but is not limited to the scope thereof. Any experimental methods with no conditions specified in the following examples are selected according to the conventional methods and conditions, or product specifications.

Inspection Method

1. Determination of Shore a Hardness

The Shore A hardness of the cured silicone composition (hereinafter referred to as "elastomer") of the present invention is determined in accordance with ISO 868-2003 (or Chinese Standard GBIT 2411-2008).

2. Measurement of Tensile Strength, Elongation at Break and 100% Modulus

The tensile strength, elongation at break, and 100% modulus of the elastomer of the present invention are measured in accordance with ISO 37-2011 (or Chinese Standard GB/T 528-2009).

Examples 1-8 and Comparative Examples 1-4: Polysiloxane Compositions

The compositions are obtained by mixing the ingredients as per their respective amounts listed in Table 1.

Table 1 shows the ingredients of Examples and Comparative Examples and amounts thereof. The amounts in Table 1 are, unless otherwise specified, in parts by weight.

Information on ingredients referred to in Table 1:

WACKER® POLYMER FD 80, an α,ω-dihydroxy-polydimethylsiloxane, having a dynamic viscosity of about 75,000 mPa·s, as measured at 23° C. according to DIN 53019, supplied by Wacker Chemicals.

DBS, di-tert-butoxydiacetoxysilane.

DMDAS, dimethyldiacetoxysilane.

WACKER® AK 100, a polydimethylsiloxane, having a dynamic viscosity of 95-105 mPa·s, as measured at 25° C. according to DIN 53019, supplied by Wacker Chemicals.

WACKER® SILICONE RESIN B 1100, a MO silicone resin, having a dynamic viscosity of 10,000-500,000 mPa·s, as measured at 25° C. according to DIN 53019, supplied by Wacker Chemicals.

GENIOSIL® XL 10, a vinyltrimethoxysilane, supplied by Wacker Chemie AG.

Ethoxy-terminated 3-aminopropylmethylsilsesquioxane, having a dynamic viscosity of about 7 mPa·s, as measured at 25° C. according to DIN 51562, supplied by Wacker Chemicals.

PFLEX, a precipitated calcium carbonate, supplied by the U.S. Specialty Minerals Inc.

Hydrocarb 95T, a ground calcium carbonate, supplied by Omya.

Other starting materials are commercially available.

Table 2 shows the results of performance tests for Shore A hardness, tensile strength, elongation at break and 100% modulus of the elastomer obtained by curing the polysiloxane compositions of Examples and Comparative Examples. As can be seen from Table 2, the elastomers of Examples 1-8 have a lower modulus and the 100% modulus is lower than 0.7 MPa. By further comparing Example 1 and Comparative Example 1 as well as Example 5 and Comparative Example 2, it can be revealed that adding a small amount of DBS even in polysiloxane compositions with a high filler content (40 wt % or even 55 wt %) can significantly reduce the modulus of the elastomers. The compositions of Comparative Examples 3 and 4 were not cured, indicating that too much DBS would affect curing.

TABLE 1

| Ingredients | Ex. 1 | Ex. 2 | Ex. 3 | Ex. 4 | Ex. 5 | Ex. 6 | Ex. 7 | Ex. 8 | C. Ex. 1 | C. Ex. 2 | C. Ex. 3 | C. Ex. 4 |
|---|---|---|---|---|---|---|---|---|---|---|---|---|
| WACKER ® POLYMER FD 80 | 41.36 | 46.32 | 46.21 | 41.21 | 35.40 | 35.00 | 34.50 | 35.40 | 41.26 | 36.76 | 34.76 | 36.26 |
| DBS | 0.10 | 0.11 | / | / | 0.10 | 0.50 | 1.00 | / | / | / | 2.00 | / |
| DMDAS | / | / | 0.11 | 0.11 | / | / | / | 0.10 | / | / | / | 0.50 |
| WACKER ® AK 100 | 12.25 | 7.35 | 7.46 | 12.46 | 7.25 | 7.25 | 7.25 | 7.25 | 12.45 | 7.25 | 7.25 | 7.25 |
| WACKER ® SILICONE RESIN B 1100 | / | 2.50 | 2.50 | 2.50 | 3.00 | 3.00 | 3.00 | 3.00 | / | 3.00 | 3.00 | 3.00 |
| Methyltrimethoxysilane | 0.53 | 1.81 | 1.81 | 1.81 | 1.29 | 1.29 | 1.29 | 1.29 | 0.53 | 1.29 | 1.29 | 1.29 |
| GENIOSIL ® XL 10 | 3.76 | / | / | / | 0.21 | 0.21 | 0.21 | 0.21 | 3.76 | 0.21 | 0.21 | 0.21 |
| ethoxy-terminated 3-aminopropylmethylsilsesquioxane | / | 1.29 | 1.29 | 1.29 | 0.95 | 0.95 | 0.95 | 0.95 | / | 0.95 | 0.95 | 0.95 |
| γ-Aminopropyltrimethoxysilane | / | 0.57 | 0.57 | 0.57 | / | / | / | / | / | / | / | / |
| γ-Aminopropyltriethoxysilane | / | / | / | / | 0.34 | 0.34 | 0.34 | 0.34 | / | 0.34 | 0.34 | 0.34 |
| PFLEX | 40.00 | 40.00 | 40.00 | 40.00 | 35.00 | 35.00 | 35.00 | 35.00 | 40.0 | 35.00 | 35.00 | 35.00 |
| Hydrocarb 95T | / | / | / | / | 15.00 | 15.00 | 15.00 | 15.00 | / | 15.00 | 15.00 | 15.00 |
| Diisopropyl bis(ethyl acetoacetate) titanate | 2.00 | / | / | / | / | / | / | / | 2.00 | / | / | / |
| Dioctyltin dilaurate | / | 0.05 | 0.05 | 0.05 | / | / | / | / | / | / | / | / |
| Dibutyltin dilaurate | / | / | / | / | 0.20 | 0.20 | 0.20 | 0.20 | / | 0.20 | 0.20 | 0.20 |

TABLE 2

| Indicator | Ex. 1 | Ex. 2 | Ex. 3 | Ex. 4 | Ex. 5 | Ex. 6 | Ex. 7 | Ex. 8 | C. Ex. 1 | C. Ex. 2 | C. Ex. 3 | C. Ex. 4 |
|---|---|---|---|---|---|---|---|---|---|---|---|---|
| Shore A hardness | 18.0 | 17.0 | 14.4 | 16.3 | 28.9 | 16.5 | 8.1 | 25.9 | 24.3 | 28.1 | N/A, due to no curing | N/A, due to no curing |
| Tensile strength (MPa) | 1.62 | 2.02 | 1.71 | 1.61 | 1.63 | 1.44 | 0.95 | 1.72 | 1.53 | 1.54 | | |
| Elongation at break (%) | 471.89 | 857.86 | 846.89 | 828.20 | 370.54 | 664.29 | 750.13 | 436.38 | 379.58 | 324.03 | | |
| 100% modulus (MPa) | 0.45 | 0.35 | 0.31 | 0.27 | 0.67 | 0.31 | 0.19 | 0.58 | 0.56 | 0.72 | | |

What is claimed is:

1. A polysiloxane composition comprising:
   a) at least one hydroxyl-terminated polyorganosiloxane;
   b) at least one diacetoxysilane, having the formula:

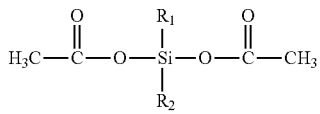

where, $R_1$ and $R_2$ are each independently an alkyl group, or an alkoxy group having one or more carbon atoms;
   c) at least one multifunctional alkoxysilane crosslinker selected from the group consisting of methyltrimethoxysilane, methyltriethoxysilane, vinyltrimethoxysilane, vinyltriethoxysilane, tetramethoxysilane, tetraethoxyoxysilane, phenyltrimethoxysilane, phenyltriethoxysilane, and combinations thereof;
   d) at least one filler; and
   e) at least one catalyst.

2. The polysiloxane composition of claim 1, wherein the composition comprises less than 4 parts by weight of multifunctional acetoxysilane, based on 100 parts by weight of ingredient (a).

3. The polysiloxane composition of claim 1, wherein ingredient (a) is present in an amount of from 10 wt % to 85 wt % and ingredient (b) is present in an amount of from 0.03 wt % to 1.9 wt %, based on the total weight of the starting materials of the polysiloxane composition.

4. The polysiloxane composition of claim 1, wherein ingredient (b) is used in an amount of from 0.03 wt % to 1.9 wt % and ingredient (c) from 0.5 wt % to 8 wt %, based on the total weight of the starting materials of the polysiloxane composition.

5. The polysiloxane composition of claim 1, wherein ingredient (a) has a kinematic viscosity at 25° C. ranging from 20,000 to 100,000 mm²/s.

6. A polysiloxane composition comprising:
   a) at least one hydroxyl-terminated polyorganosiloxane;
   b) at least one diacetoxysilane, having the formula:

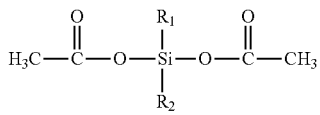

where, $R_1$ and $R_2$ are each independently an alkyl group, or an alkoxy group having one or more carbon atoms;
   c) at least one multifunctional alkoxysilane;
   d) at least one filler; and
   e) at least one catalyst,
   wherein in ingredient (b) $R_1$ and $R_2$ are each independently a C1-C16 alkyl group, and the mass ratio of ingredient (a) to ingredient (b) is (75-1400): 1.

7. The polysiloxane composition of claim 1, wherein in ingredient (b) where $R_1$ and $R_2$ are each independently an alkoxy group having 1 to 16 carbon atoms, and the mass ratio of ingredient (a) to ingredient (b) is (20-1400): 1.

8. A polysiloxane composition comprising:
   a) at least one hydroxyl-terminated polyorganosiloxane;
   b) at least one diacetoxysilane, having the formula:

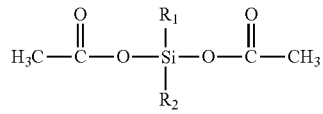

where, $R_1$ and $R_2$ are each independently an alkyl group, or an alkoxy group having one or more carbon atoms;
   c) at least one multifunctional alkoxysilane;
   d) at least one filler; and
   e) at least one catalyst,
   wherein ingredient (d) is present in an amount of from 20 wt % to 60 wt %, based on the total weight of the starting materials of the polysiloxane composition.

9. The polysiloxane composition of claim 1, comprising a silicone resin (f).

10. The polysiloxane composition of claim 9, wherein silicon resin (f) has a dynamic viscosity at 25° C. ranging from 10,000 to 500,000 mPa·s.

11. The polysiloxane composition of claim 1, wherein the composition comprises less than 20 wt % of plasticizer, based on the total weight of the starting materials of the polysiloxane composition.

12. The polysiloxane composition of claim 1, wherein the catalyst is an organotin or organotitanium compound.

13. An elastomer it is obtained by curing a polysiloxane composition of claim 1.

14. The polysiloxane composition of claim 1, which contains less than 15 weight percent plasticizer based on the total weight of the composition.

15. The polysiloxane composition of claim 1, which contains less than 10 weight percent plasticizer based on the total weight of the composition.

16. The polysiloxane composition of claim 1, which is free of plasticizer.

17. The polysiloxane composition of claim 1, which contains less than 10% by weight of silicone resin based upon the total weight of the composition.

18. The polysiloxane composition of claim 1, which contains less than 5% by weight of silicone resin based on the total weight of the composition.

19. The composition of claim 1, which has a 100% modulus of less than 0.7 MPa.

20. The composition of claim 14, which is a 100% modulus of less than 0.7 MPa.

* * * * *